United States Patent [19]

Jones

[11] 4,238,975
[45] Dec. 16, 1980

[54] SELF-CENTERING PUSH-PULL CABLE APPARATUS

[75] Inventor: Thomas L. Jones, Adrian, Mich.

[73] Assignee: Acco Industries Inc., Trumbull, Conn.

[21] Appl. No.: 911,823

[22] Filed: Jun. 2, 1978

[51] Int. Cl.³ .......................... F16C 1/10; G05G 1/00
[52] U.S. Cl. ......................................... 74/502; 74/470
[58] Field of Search ................. 74/501 R, 501.5, 502, 74/470

[56] References Cited

U.S. PATENT DOCUMENTS

| 3,604,404 | 9/1971 | Pitchford | 74/470 |
| 3,653,277 | 4/1972 | Gilmore | 74/502 |

FOREIGN PATENT DOCUMENTS

| 157114 | 11/1932 | Switzerland | 74/501 |
| 22638 | of 1911 | United Kingdom | 74/501 |

*Primary Examiner*—Kenneth Dorner
*Attorney, Agent, or Firm*—Pennie & Edmonds

[57] ABSTRACT

A self-centering, push-pull cable apparatus for automatically returning a controllable mechanism from an actuated position to a neutral, centered position. The cable apparatus includes a push-pull cable having an outer housing element and an inner movable core element and a two-way spring device operatively connected at one end to the outer sheath and at its other end to the core element. The spring device is oriented in axial alignment with the longitudinal axis of the cable apparatus and applies a force in both axial directions. This permits automatic return of the core element to a centered position when the input load is relaxed.

10 Claims, 4 Drawing Figures

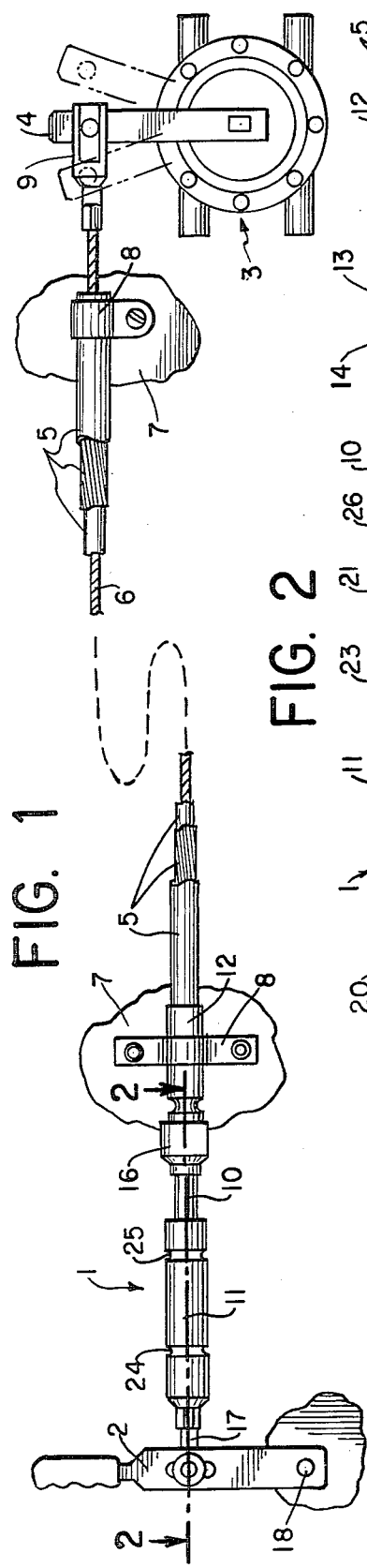
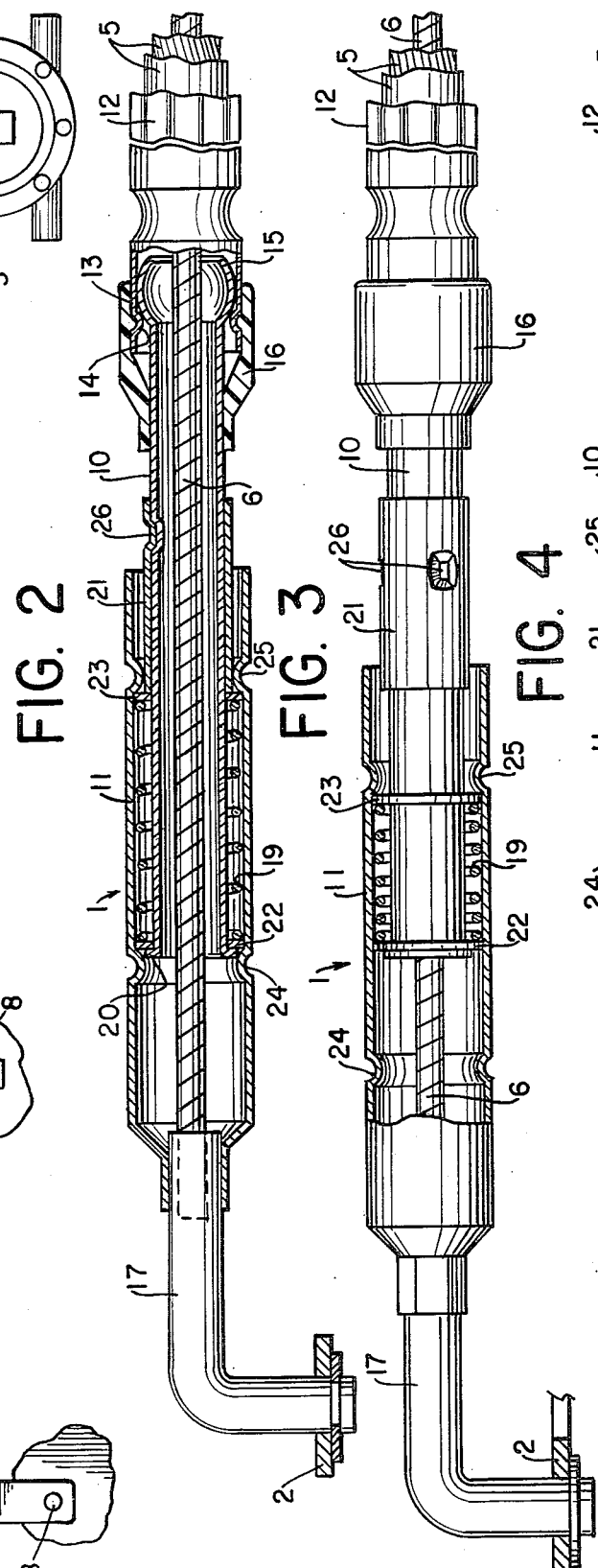
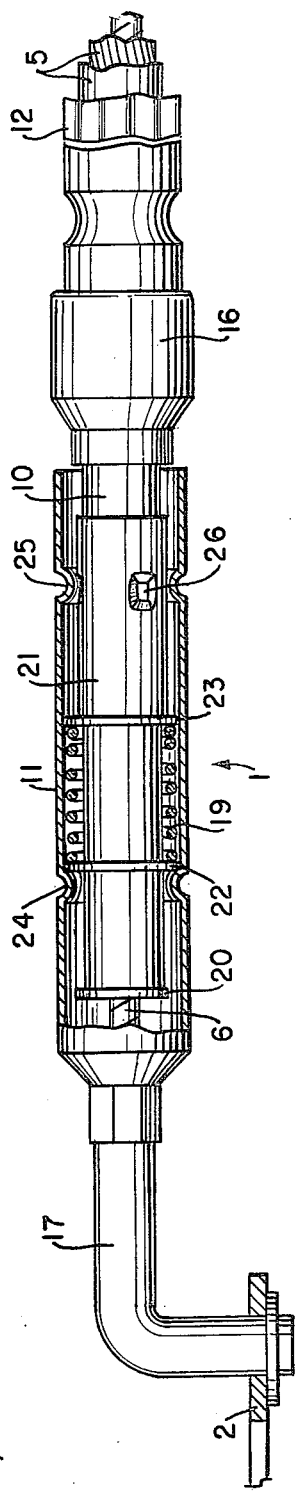
FIG. 1  FIG. 2  FIG. 3  FIG. 4

SELF-CENTERING PUSH-PULL CABLE APPARATUS

BACKGROUND OF THE INVENTION

1. Field of the Invention

This invention relates to a self-centering, push-pull cable apparatus usable for automatically returning controllable mechanisms to a neutral, centered position.

2. Description of the Prior Art

Push-pull cables are used frequently to control the operation of remotely situated mechanisms such as hydraulic valves and similar devices which, in turn, may form part of the control system for machinery. In numerous applications, it is necessary that the controllable mechanism be movable to either side of a neutral, centered position. For example, with a hydraulic valve, this may be required to provide forward and reverse actuation of the machinery with which the valve is associated. In such situations, it is also sometimes desirable that the controllable mechanism normally return to its neutral, centered position when the actuating force applied to it is released. Where a push-pull cable apparatus is used to control the mechanism, this means that the cable should return to the neutral position after relaxing of the pushing or pulling input load applied to the cable.

In the past, spring devices have been available for use in connection with push-pull cables to provide the return action to the neutral position. In some installations, devices of this nature are typically connected to the control mechanism independently of the push-pull cable apparatus. Some of these constructions are capable of producing automatic return from a single direction while others provide for automatic return from actuated positions on either side of a neutral position.

With the prior art constructions described above, employment of a spring return device in association with a conventional push-pull cable becomes rather cumbersome. Special attachments must be provided for installation of the combined system. In addition, the separate and remotely situated spring return device requires additional space which may be a handicap where space is at a premium.

SUMMARY OF THE PRESENT INVENTION

In accordance with the teachings of the present invention, applicant has devised a modification of the conventional push-pull cable apparatus whereby a spring device for maintaining a neutral, centered position is incorporated as an integral part of the cable apparatus. In construction, the spring device is connected to the cable apparatus in an orientation which is coaxial with the cable. Advantageously, the connection is made at the end of the cable apparatus adapted to be controlled by the operator.

In construction, the improved self-centering push-pull cable apparatus includes a pair of tubular housing members. One of these members is connected at one end to the outer sheath of the cable apparatus with its other end disposed in telescoped relationship with the other housing. The other housing, in turn, is connected at one end to the core element of the push-pull cable. The two housings, in the area where they are in telescoped relationship, are interconnected by a loaded spring. The spring is preferably enclosed within the housing structure and functions to bias the core element of the cable apparatus to a centered, neutral position. In this way, movement of the core element in either direction and subsequent release of the input load will cause automatic return of the core element to its neutral position.

BRIEF DESCRIPTION OF THE DRAWINGS

FIG. 1 is an elevational view depicting the self-centering, push-pull cable apparatus of the present invention connected to a control lever of a valve mechanism;

FIG. 2 is an enlarged cross-sectional view of the apparatus taken substantially along section line 2—2 of FIG. 1 and showing the apparatus in a neutral position;

FIG. 3 is a view similar to FIG. 2, but showing the apparatus in one operative position; and FIG. 4 is another view similar to FIG. 2, but showing the apparatus in another operative position.

DETAILED DESCRIPTION OF THE PREFERRED EMBODIMENTS

FIG. 1 shows the improved self-centering, push-pull cable apparatus 1 connected at one end to an operator's control handle 2 and at its other end to the mechanism 3 to be controlled by the apparatus. In the illustrated embodiment, the mechanism is a hydraulic control valve and includes a control lever 4 adapted to be moved on either side of a centered, neutral position. In FIG. 1, the neutral position is shown in solid lines; whereas, the two actuated positions on either side of neutral are shown in dotted lines.

The basic structure of the push-pull cable is conventional and includes a three-part outer housing sheath 5 and an inner slidable core element 6. The sheath is secured at its opposite ends to support structure 7 by means of suitable clamps 8. Adjacent the hydraulic valve, the core element 6 of the cable extends beyond the sheath and is connected to the lever by way of the coupling 9. The other end of the core element is operatively connected to the handle 2 whereby movement of the handle to the left and right of the position shown in FIG. 1 will cause similar movement of the lever 4 to the left and right of the solid line position.

In accordance with the teachings of the present invention, the push-pull cable apparatus is constructed so as to normally hold the core element and the lever 4 to which it is attached in a centered, neutral position and to return these parts to this position after the input load causing movement to either side of the neutral position is relaxed. The structure for effecting this result is connected as an integral part of the push-pull cable and in axial alignment therewith. As shown in FIG. 2, a pair of tubular members 10 and 11 are connected respectively to the outer sheath of the cable and inner core element of the cable. More specifically, the tubular member 10 is connected to the outer sheath 5 by a ferrel 11 one end 12 of which is crimped onto the outer sheath and the other end 13 crimped at 14 about the enlarged spherical portion 15 formed at one end of the tubular member 10. The connecting of the tubular member 10 to the ferrel 11 in this manner provides for limited universal movement of the member 10 relative to the anchored sheath of the controlled cable.

A sealing member 16 is secured over the housing 10 and and ferrel 11 at the point of connection of these two members. This sealing member may be formed of suitable flexible material, such as rubber, and provides a seal against entry of dirt into the area of connection.

The tubular member 10 extends axially beyond the outer sheath in surrounding coaxial relationship with the core element 6. The member 10 also extends in telescoped relationship into one end of the tubular member 11. The other end of the tubular member 11 is, in turn, secured to the core element. This connection is effected by crimping the other end of the member 11 onto an actuating rod 17 which itself is connected to the free end of the core element. The actuating rod is L-shaped in construction and pivotally connected at its free end to the operator's handle 2. With this construction, back and forth movement of the operating handle 2 about its pivot support axis 18 will permit the necessary rotative movement of the actuating rod at its point of connection to the handle 2. Also, with the handle 2 moving in an arc about the pivot axis 18, the universal connection of the member 10 to the ferrel 11 will permit the necessary pivoting at this point.

The two tubular members 10 and 11 are interconnected by spring means 19. In the preferred embodiment, this spring means is a compression coil spring disposed coaxially between the telescoped portions of the two tubular members 10 and 11. The spring is held on the inner tubular member 10 by stop means formed on this member. The stop means extend radially outwardly at either end of the spring; and as shown in FIG. 2, includes a radial outwardly extending flange 20 at the end of the tubular member 10 and a sleeve 21 fixed to the outer periphery of the tubular member 10 at a location spaced axially from the flanged end. A pair of collars 22 and 23 are slidably disposed on the tubular member 10 between the flange 20 and sleeve 21. These collars have an inner portion which abuts against the flange and sleeve and an outer portion which extends radially outwardly of the flange end sleeve. With the cable apparatus in its normal neutral position, the collar 22 abuts against the flange 20 at the same time the collar 23 abuts against the sleeve 21.

In order to effect loading of the spring, that is compression thereof, upon movement of the core element to either side of its neutral position, the outer tubular member 11 is provided with drive means 24, 25. The drive means takes the shape of indentations formed into the outer tubular member at locations disposed axially beyond the ends of the spring 19 and the collars 22, 23. The forming of the drive means 24, 25 is such that the indentations extend radially inwardly into axial alignment and abutment with the radial outer portions of the collars 22, 23. The indentations stop short of being in axial alignment with the flange 20 and sleeve 21 so that axial movement of the two members 10 and 11 can be effected without interference.

The axial spacing of the indentations 24. 25 is such that they will both spit against the adjacent collars 22, 23 when the cable control apparatus is in its neutral position. To assure that the indentations 24, 25 will be in this orientation, all parts are assembled prior to securing the sleeve 21 onto member 10. More specifically, the tubular member 10 with the loosely assembled collars, spring and sleeve are inserted into the outer tubular member 11 until the collar 22 abuts against the indentation 24. The proper location for the other indentation 25, with the spring relaxed or partially compressed, is then determined and formed into the housing 11. The sleeve 21 may be slid along the tubular member 10 to hold the spring in its desired position during the forming of the indentation 25. After this operation is completed, the sleeve 21 can then be suitably secured against axial movement on the tubular member 10 as by crimping at 26. With this construction and assembly procedure, the spring is tightly contained axially between the tubular members and lost motion that might otherwise be incurred during push-pull operation of the core element is avoided.

Also, with the construction and assembly of the parts as described above, the spring is fixed relative to the inner tubular member so that movement of the outer tubular member in either direction will cause compression of the spring. More specifically, the fixing of the spring to the inner tubular member is such that its opposite ends are fixed against axial movement in the same direction at the same time. In this way, movement of the outer tubular member in either direction will cause compression of this spring from one end thereof while the other end is held fixed relative to the inner tubular member 10.

In operation of the push-pull cable apparatus, movement of the control handle 2 to the left will cause the parts to move relative to each other and to the position shown in FIG. 3. During this movement, the stop 20 and associated collar 22 will prevent axial movement of the adjacent end of the spring 19 while the drive means in the form of the indentation 25 will cause the collar 23 to slide to the left and compress the spring 19. With the spring thus in loaded condition, relaxation of the pulling load on the core element will be followed automatically by expansion of the spring. This, in turn, will drive the parts back to their neutral position shown in FIG. 2; and with the operating end of the core element connected to the lever 4 of the hydraulic valve, the valve will be automatically returned to its neutral, centered position.

When the push-pull cable apparatus is loaded with a pushing load as by movement of the handle 2 to the right from the position shown in FIG. 1, the compression spring will be compressed from its other end to the condition shown in FIG. 4. Again, upon relaxation of the pushing load on the core element, the loaded spring will return the parts to their neutral position of FIG. 2.

In the preferred embodiment of the invention as shown in the drawings and described above, the tubular members completely encircle the cable structure to provide a closed construction which is advantageous as far as precluding the entry of foreign matter into the apparatus. Is is to be understood, however, that the tubular members could be open sided or some other shape than tubular. Also, the structure for spring loading the cable could be connected at the end adjacent the hydraulic valve 3, if desired; and the spring could take a form other than a compression spring.

I claim:

1. A self-centering, push-pull cable apparatus comprising:
   (a) an outer elongated cable sheath;
   (b) a core element disposed internally of said sheath for sliding, reciprocating movement therein;
   (c) a first member connected to the cable sheath in at least partially surrounding relationship with the core element;
   (d) a second member connected to the core element in at least partially surrounding relationship therewith and having a portion disposed in axial, overlapping relationship with said first member for reciprocating, axial movement relative thereto upon similar movement of the core element reltive to the cable sheath as caused by the application of an input load to the core element; and
   (e) spring means interconnecting said first and second members for normally holding them in a neutral, axial position and returning them to said neutral position after release of any input load being applied to the core element and causing axial movement of one of said members relative to the other in either axial direction from said neutral position, said spring means being disposed between said first and second members at the overlapped ends thereof, and extending along the overlapped end of the first member with its opposite ends fixed against axial movement in the same direction at the same time.

2. A self-centering, push-pull cable apparatus comprising:
  (a) an outer elongated cable sheath;
  (b) a core element disposed internally of said sheath for sliding, reciprocating movement therein;
  (c) a first tubular member connected to the cable sheath in surrounding, coaxial relationship with the core element;
  (d) a second tubular member connected to the core element in surrounding coaxial relationship therewith and having a portion disposed in telescoped relationship with said first member for reciprocating, axial movement relative thereto upon similar movement of the core element relative to the cable sheath as caused by the application of an input load to the core element; and
  (e) spring means interconnecting said first and second members for normally holding them in a neutral, axial position and returning them to said neutral position after release of any input load being applied to the core element and causing axial movement of one of said members relative to the other in either axial direction from said neutral position, said spring means being disposed between said first and second members at the telescoped ends thereof, and extending along the telescoped end of the first tubular member with its opposite ends fixed against axial movement in the same direction at the same time.

3. A self-centering, push-pull cable apparatus according to claim 2 wherein:
  (a) the first and second tubular members are connected at one end to said sheath and core element respectively; and
  (b) the other end of the first tubular member is disposed in internally telescoped relationship with the other end of said second tubular member.

4. A self-centering, push-pull cable apparatus comprising:
  (a) an outer elongated cable sheath;
  (b) a core element disposed internally of said sheath for sliding, reciprocating movement therein;
  (c) a first tubular member connected to the cable sheath in surrounding, coaxial relationship with the core element;
  (d) a second tubular member connected to the core element in surrounding coaxial relationship therewith and having a portion disposed in telescoped relationship with said first member for reciprocating, axial movement relative thereto upon similar movement of the core element relative to the cable sheath as caused by the application of an input load to the core element, said first and second tubular members being connected at one end to said sheath and core element, respectively, the other end of the first tubular member being disposed in internally telescoped relationship with the other end of said second tubular member;
  (e) spring means interconnecting said first and second members for normally holding them in a neutral, axial position and returning them to said neutral position after release of any input load being applied to the core element and causing axial movement of one of said members relative to the other in either axial direction from said neutral position, said spring means being disposed between said first and second members at the telescoped ends thereof,
    said spring means extending along the telescoped end of the first tubular member with its opposite ends fixed against axial movement in the same direction at the same time; and
    said second tubular member including drive means disposed at either end of said spring means in axial alignment therewith for causing loading of the spring means upon movement of the second member in either axial direction from said neutral position.

5. A self-centering, push-pull cable apparatus according to claim 4 wherein:
  (a) said spring means is a compression spring disposed in surrounding relationship with the telescoped end of the first tubular member; and
  (b) said drive means is disposed axially beyond each end of said spring to cause compression loading thereof upon movement of the second member in either axial direction from said neutral position.

6. A self-centering, push-pull cable apparatus according to claim 5 wherein:
  (a) said first tubular member includes first and second stop means extending radially outwardly therefrom at either end of said spring;
  (b) a pair of collars are slidably disposed on said first tubular member between said first and second stop means with one collar adjacent each stop means and having:
    (1) an inner portion abutting the stop means when said second tubular member is in said neutral position, and
    (2) an outer portion disposed radially outwardly of said stop means; and
  (c) said drive means extends radially inwardly from the second tubular member at locations axially beyond each of said collars and in abutting engagement with the outer portions thereof when said second tubular member is in said neutral position.

7. A self-centering, push-pull cable apparatus according to claim 6 wherein:
  (a) the first stop means comprises:
    (1) a radially outwardly extending flange at the end of the first tubular member telescoped within the second tubular member; and
  (b) the second stop means comprises:
    (2) a sleeve fixed to the other periphery of said first tubular member at a location spaced axially from the flanged end thereof; and
  (c) said drive means is defined by indentations formed on the second tubular member.

8. A self-centering, push-pull cable apparatus according to claim 7 wherein:
  (a) said first tubular member is connected at one end to the sheath of the cable for limited universal movement with respect thereto.

9. An apparatus adapted for automatically centering a cable comprising:

(a) a first member for being in at least partially surrounding relation to the cable;

(b) a second member connectable to the cable for conjoint movement therewith in at least partially surrounding relationship with the cable and having a portion disposed in overlapping relationship with said first member for reciprocating movement relative thereto upon similar movement of the cable as caused by the application of an input load to the cable; and (c) spring means interconnecting said first and second members for normally holding them in a neutral position and returning them to said neutral position upon release of any input load being applied to the cable causing movement of one of said members relative to the other in either direction from said neutral position, said spring means being disposed between said first and second members at the overlapped ends thereof, and extending along the overlapped end of the first tubular member with its opposite ends fixed against axial movement in the same direction at the same time.

10. An self-centering apparatus adapted for automatically centering a cable comprising:

(a) a first member for being in at least partially surrounding relation to the cable, said first member including stop means extending radially outwardly therefrom at both ends of said spring means;

(b) a second member connectable to the cable for conjoint movement therewith in at least partially surrounding relationship with the cable and having a portion disposed in overlapping relationship with said first member for reciprocating movement relative thereto upon similar movement of the cable as caused by the application of an input load to the cable; and (c) spring means interconnecting said first and second members for normally holding them in a neutral position and returning them to said neutral position upon release of any input load being applied to the cable causing movement of one of said members relative to the other in either direction from said neutral position;

(d) a pair of collars slidably disposed on said first member between said stop means with one collar adjacent each stop means and having:
  (1) an inner portion abutting the stop means when said second member is in said neutral position, and
  (2) an outer portion disposed radially outwardly of said stop means; and (e) drive means extending radially inwardly from the second member at locations axially beyond each of said collars and in abutting engagement with the outer portions thereof when said second member is in said neutral position.

* * * * *